(12) United States Patent
Jang et al.

(10) Patent No.: US 12,530,259 B2
(45) Date of Patent: Jan. 20, 2026

(54) MEMORY CONTROLLER, MEMORY SYSTEM AND OPERATING METHOD OF MEMORY SYSTEM

(71) Applicant: SK hynix Inc., Gyeonggi-do (KR)

(72) Inventors: Woong Ju Jang, Gyeonggi-do (KR); Hoiju Chung, San Jose, CA (US); Yong Jun Lee, San Jose, CA (US); Dong Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 67 days.

(21) Appl. No.: 18/624,144

(22) Filed: Apr. 2, 2024

(65) Prior Publication Data

US 2025/0077347 A1    Mar. 6, 2025

Related U.S. Application Data

(60) Provisional application No. 63/579,688, filed on Aug. 30, 2023.

(51) Int. Cl.
*G06F 11/00* (2006.01)
*G06F 11/10* (2006.01)

(52) U.S. Cl.
CPC .................. *G06F 11/106* (2013.01)

(58) Field of Classification Search
CPC .... G06F 11/106; G06F 11/0787; G06F 11/08; G06F 11/10; G06F 11/1048; G06F 2211/1088
See application file for complete search history.

(56) References Cited

U.S. PATENT DOCUMENTS

| | | | |
|---|---|---|---|
| 6,101,614 A * | 8/2000 | Gonzales | G06F 11/106 710/39 |
| 7,681,096 B2 | 3/2010 | Sasaki et al. | |
| 9,064,546 B2 | 6/2015 | Son et al. | |
| 11,557,332 B2 | 1/2023 | Cha et al. | |
| 2009/0177932 A1 * | 7/2009 | Abts | G06F 11/141 714/763 |
| 2022/0208293 A1 * | 6/2022 | Kim | G11C 29/4401 |
| 2023/0161665 A1 * | 5/2023 | Choi | G06F 11/106 714/6.1 |
| 2023/0368856 A1 * | 11/2023 | Wang | G11C 29/42 |

* cited by examiner

*Primary Examiner* — Joseph D Manoskey
(74) *Attorney, Agent, or Firm* — IP & T GROUP LLP

(57) ABSTRACT

A memory controller includes a scrub control circuit configured to generate a scrub command for instructing a scrub operation; and an address generation circuit configured to generate a scrub address having an address sequence in which a first column bit group of a column address, a row address, and a second column bit group of the column address are sequentially allocated from a least significant bit (LSB) to a most significant bit (MSB), and change a value of the scrub address according to the scrub command.

33 Claims, 19 Drawing Sheets

FIG. 4A

| PS | RA | | | | | CA | | | | | | |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 1 |
| ... | ... | | | | | ... | | | | | | |
| 128 | 0 | 0 | 0 | 0 | 0 | 1 | 1 | 1 | 1 | 1 | 1 | 1 |
| 129 | 0 | 0 | 0 | 0 | 1 | 0 | 0 | 0 | 0 | 0 | 0 | 0 |
| 130 | 0 | 0 | 0 | 0 | 1 | 0 | 0 | 0 | 0 | 0 | 0 | 1 |
| ... | ... | | | | | ... | | | | | | |
| 256 | 0 | 0 | 0 | 0 | 1 | 1 | 1 | 1 | 1 | 1 | 1 | 1 |
| 3969 | 1 | 1 | 1 | 1 | 1 | 0 | 0 | 0 | 0 | 0 | 0 | 0 |
| 3970 | 1 | 1 | 1 | 1 | 1 | 0 | 0 | 0 | 0 | 0 | 0 | 1 |
| ... | ... | | | | | ... | | | | | | |
| 4096 | 1 | 1 | 1 | 1 | 1 | 1 | 1 | 1 | 1 | 1 | 1 | 1 |

| PS | CA_H | | | RA | | | | | CA_L | | | |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 1 |
| ... | ... | | | ... | | | | | ... | | | |
| 16 | 0 | 0 | 0 | 0 | 0 | 0 | 0 | 0 | 1 | 1 | 1 | 1 |
| 17 | 0 | 0 | 0 | 0 | 0 | 0 | 0 | 1 | 0 | 0 | 0 | 0 |
| 18 | 0 | 0 | 0 | 0 | 0 | 0 | 0 | 1 | 0 | 0 | 0 | 1 |
| ... | ... | | | ... | | | | | ... | | | |
| 32 | 0 | 0 | 0 | 0 | 0 | 0 | 0 | 1 | 1 | 1 | 1 | 1 |
| 512 | 0 | 0 | 0 | 1 | 1 | 1 | 1 | 1 | 1 | 1 | 1 | 1 |
| 513 | 0 | 0 | 1 | 0 | 0 | 0 | 0 | 0 | 0 | 0 | 0 | 0 |
| 3969 | 1 | 1 | 1 | 1 | 1 | 0 | 0 | 0 | 0 | 0 | 0 | 0 |
| 3970 | 1 | 1 | 1 | 1 | 1 | 0 | 0 | 0 | 0 | 0 | 0 | 1 |
| ... | ... | | | ... | | | | | ... | | | |
| 4096 | 1 | 1 | 1 | 1 | 1 | 1 | 1 | 1 | 1 | 1 | 1 | 1 |

"+1"

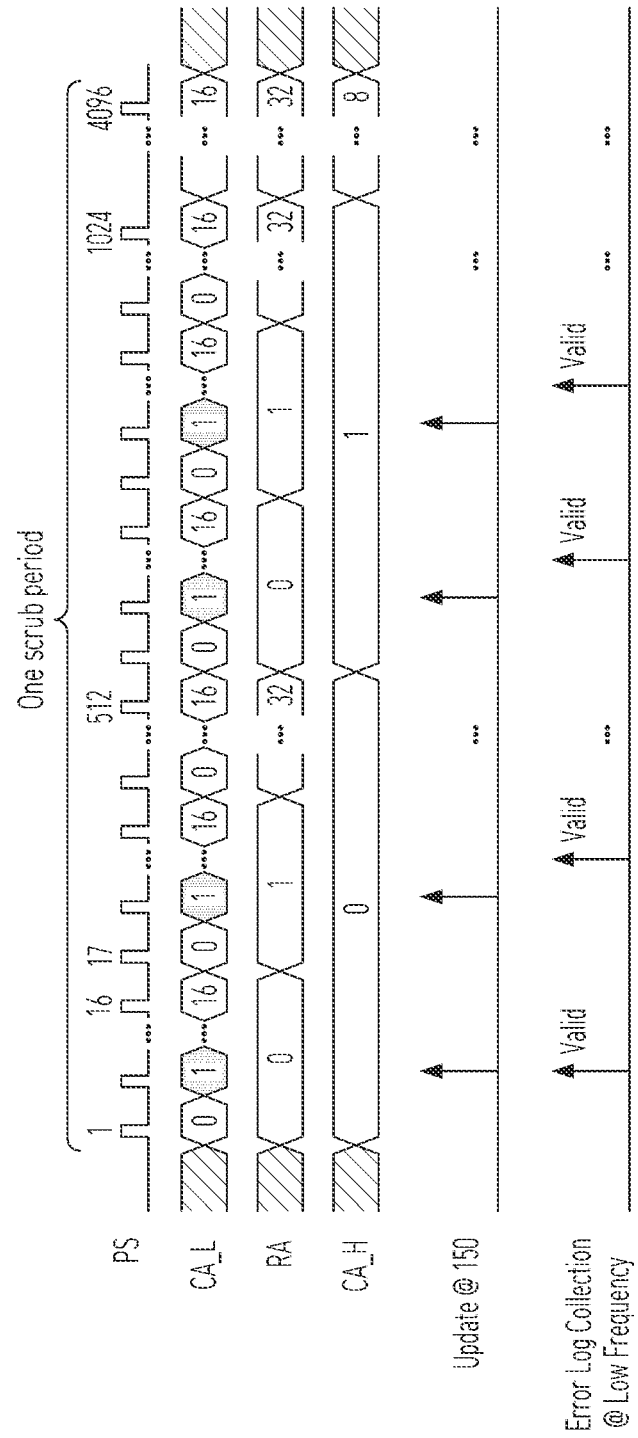

FIG. 7A

|  | PS | CA_H | RA | CA_L |
|---|---|---|---|---|
| (a) | 1-4 | CG1 | R1 | C1→C2→C3→C4 |
|  | 5-8 | CG1 | R2 | C1→C2→C3→C4 |
|  | 9-12 | CG1 | R3 | C1→C2→C3→C4 |
|  | 13-16 | CG1 | R4 | C1→C2→C3→C4 |
| (b) | 17-20 | CG2 | R1 | C1→C2→C3→C4 |
|  | 21-24 | CG2 | R2 | C1→C2→C3→C4 |
|  | 25-28 | CG2 | R3 | C1→C2→C3→C4 |
|  | 29-32 | CG2 | R4 | C1→C2→C3→C4 |
| (c) | 33-36 | CG3 | R1 | C1→C2→C3→C4 |
|  | 37-40 | CG3 | R2 | C1→C2→C3→C4 |
|  | 41-44 | CG3 | R3 | C1→C2→C3→C4 |
|  | 45-48 | CG3 | R4 | C1→C2→C3→C4 |
| (d) | 49-52 | CG4 | R1 | C1→C2→C3→C4 |
|  | 53-56 | CG4 | R2 | C1→C2→C3→C4 |
|  | 57-60 | CG4 | R3 | C1→C2→C3→C4 |
|  | 61-64 | CG4 | R4 | C1→C2→C3→C4 |

|     | PS    | CA_H | RA | CA_L |
|-----|-------|------|----|------|
| (a) | 1-4   | CG1  | R1 | C1→C3→C2→C4 |
|     | 5-8   | CG1  | R2 | C1→C3→C2→C4 |
|     | 9-12  | CG1  | R3 | C1→C3→C2→C4 |
|     | 13-16 | CG1  | R4 | C1→C3→C2→C4 |
| (b) | 17-20 | CG2  | R1 | C1→C3→C2→C4 |
|     | 21-24 | CG2  | R2 | C1→C3→C2→C4 |
|     | 25-28 | CG2  | R3 | C1→C3→C2→C4 |
|     | 29-32 | CG2  | R4 | C1→C3→C2→C4 |
| (c) | 33-36 | CG3  | R1 | C1→C3→C2→C4 |
|     | 37-40 | CG3  | R2 | C1→C3→C2→C4 |
|     | 41-44 | CG3  | R3 | C1→C3→C2→C4 |
|     | 45-48 | CG3  | R4 | C1→C3→C2→C4 |
| (d) | 49-52 | CG4  | R1 | C1→C3→C2→C4 |
|     | 53-56 | CG4  | R2 | C1→C3→C2→C4 |
|     | 57-60 | CG4  | R3 | C1→C3→C2→C4 |
|     | 61-64 | CG4  | R4 | C1→C3→C2→C4 |

|  | PS | CA_H | RA | CA_L |
|---|---|---|---|---|
| (a) | 1-4 | CG1 | R1 | C1→C2→C3→C4 |
|  | 5-8 | CG1 | R3 | C1→C2→C3→C4 |
|  | 9-12 | CG1 | R2 | C1→C2→C3→C4 |
|  | 13-16 | CG1 | R4 | C1→C2→C3→C4 |
| (b) | 17-20 | CG2 | R1 | C1→C2→C3→C4 |
|  | 21-24 | CG2 | R3 | C1→C2→C3→C4 |
|  | 25-28 | CG2 | R2 | C1→C2→C3→C4 |
|  | 29-32 | CG2 | R4 | C1→C2→C3→C4 |
| (c) | 33-36 | CG3 | R1 | C1→C2→C3→C4 |
|  | 37-40 | CG3 | R3 | C1→C2→C3→C4 |
|  | 41-44 | CG3 | R2 | C1→C2→C3→C4 |
|  | 45-48 | CG3 | R4 | C1→C2→C3→C4 |
| (d) | 49-52 | CG4 | R1 | C1→C2→C3→C4 |
|  | 53-56 | CG4 | R3 | C1→C2→C3→C4 |
|  | 57-60 | CG4 | R2 | C1→C2→C3→C4 |
|  | 61-64 | CG4 | R4 | C1→C2→C3→C4 |

FIG. 10A

|  | PS | CA_H | RA | CA_L |
|---|---|---|---|---|
| (a) | 1-4 | CG1 | R1 | C1→C2→C3→C4 |
|  | 5-8 | CG1 | R2 | C1→C2→C3→C4 |
|  | 9-12 | CG1 | R3 | C1→C2→C3→C4 |
|  | 13-16 | CG1 | R4 | C1→C2→C3→C4 |
| (b) | 17-20 | CG3 | R1 | C1→C2→C3→C4 |
|  | 21-24 | CG3 | R2 | C1→C2→C3→C4 |
|  | 25-28 | CG3 | R3 | C1→C2→C3→C4 |
|  | 29-32 | CG3 | R4 | C1→C2→C3→C4 |
| (c) | 33-36 | CG2 | R1 | C1→C2→C3→C4 |
|  | 37-40 | CG2 | R2 | C1→C2→C3→C4 |
|  | 41-44 | CG2 | R3 | C1→C2→C3→C4 |
|  | 45-48 | CG2 | R4 | C1→C2→C3→C4 |
| (d) | 49-52 | CG4 | R1 | C1→C2→C3→C4 |
|  | 53-56 | CG4 | R2 | C1→C2→C3→C4 |
|  | 57-60 | CG4 | R3 | C1→C2→C3→C4 |
|  | 61-64 | CG4 | R4 | C1→C2→C3→C4 |

MEMORY CONTROLLER, MEMORY SYSTEM AND OPERATING METHOD OF MEMORY SYSTEM

CROSS-REFERENCE TO RELATED APPLICATIONS

This patent application claims priority to U.S. Provisional Application No. 63/579,688 filed on Aug. 30, 2023, which is incorporated herein by reference in its entirety.

BACKGROUND

1. Field

Various embodiments of the present disclosure relate to a semiconductor design technology, and more particularly, to a memory system which performs a scrub operation for error checking.

2. Description of the Related Art

A memory system includes a memory device and a memory controller. The memory controller may periodically monitor defects in the memory device through a scrub operation. The memory controller may store information on the monitored defects in a storage circuit and provide the stored information to a host in a polling or interrupt-based manner for the purpose of collection and analysis of error logs. The memory system may provide an optimized reliability, accessibility, and serviceability (RAS) feature by finding errors with the possibility of developing an uncorrectable error (UE) based on the collection and analysis of error logs using the scrub operation. Accordingly, various methods for efficient collection and analysis of error logs are being studied.

SUMMARY

Embodiments of the present disclosure are directed to a memory system including a memory controller capable of providing an address to a memory device by variously changing an address sequence of the address during a scrub operation.

In accordance with an embodiment of the present disclosure, a memory controller includes: a scrub control circuit configured to generate a scrub command for instructing a scrub operation; and an address generation circuit configured to generate a scrub address having an address sequence in which a first column bit group of a column address, a row address, and a second column bit group of the column address are sequentially allocated from a least significant bit (LSB) to a most significant bit (MSB), and change a value of the scrub address according to the scrub command.

In accordance with another embodiment of the present disclosure, a memory controller includes a scrub control circuit configured to generate a scrub command for instructing a scrub operation; and an address generation circuit configured to divide a column address into a first column bit group and a second column bit group, divide a row address into a first row bit group and a second row bit group, generate a scrub address having an address sequence in which the first column bit group is allocated at a least significant bit (LSB) and the second column bit group is allocated between the first row bit group and the second row bit group, and change a value of the scrub address according to the scrub command.

In accordance with yet another embodiment of the present disclosure, a memory controller includes a scrub control circuit configured to generate a scrub command for instructing a scrub operation; and an address generation circuit configured to divide a column address into a first column bit group and a second column bit group, divide a row address into a first row bit group and a second row bit group, generate a scrub address having an address sequence in which the first column bit group, the second row bit group, the first row bit group, and the second column bit group are sequentially allocated from a least significant bit (LSB) to a most significant bit (MSB), and change a value of the scrub address according to the scrub command.

In accordance with still another embodiment of the present disclosure, a memory system includes a memory controller configured to generate a scrub address having an address sequence in which a first column bit group of a column address, a row address, and a second column bit group of the column address are sequentially allocated from a least significant bit (LSB) to a most significant bit (MSB), change a value of the scrub address according to a scrub command, and provide the scrub address with the scrub command; and a memory device including memory cells arranged between a plurality of rows and a plurality of columns, the memory device configured to perform a scrub operation on a selected row and a selected column by the scrub address, according to the scrub command.

BRIEF DESCRIPTION OF THE DRAWINGS

FIGS. 4A and 4B are diagrams for describing a scrub operation according to one type of memory system that has been proposed.

FIGS. 5A and 5B are diagrams for describing a scrub operation according to an embodiment of the present disclosure.

FIGS. 7A and 7B are diagrams for describing a scrub operation according to an embodiment of the present disclosure.

FIGS. 8A and 8B are diagrams for describing a scrub operation according to another embodiment of the present disclosure.

FIGS. 9A and 9B are diagrams for describing a scrub operation according to another embodiment of the present disclosure.

FIGS. 10A and 10B are diagrams for describing a scrub operation according to another embodiment of the present disclosure.

DETAILED DESCRIPTION

Figure 1:
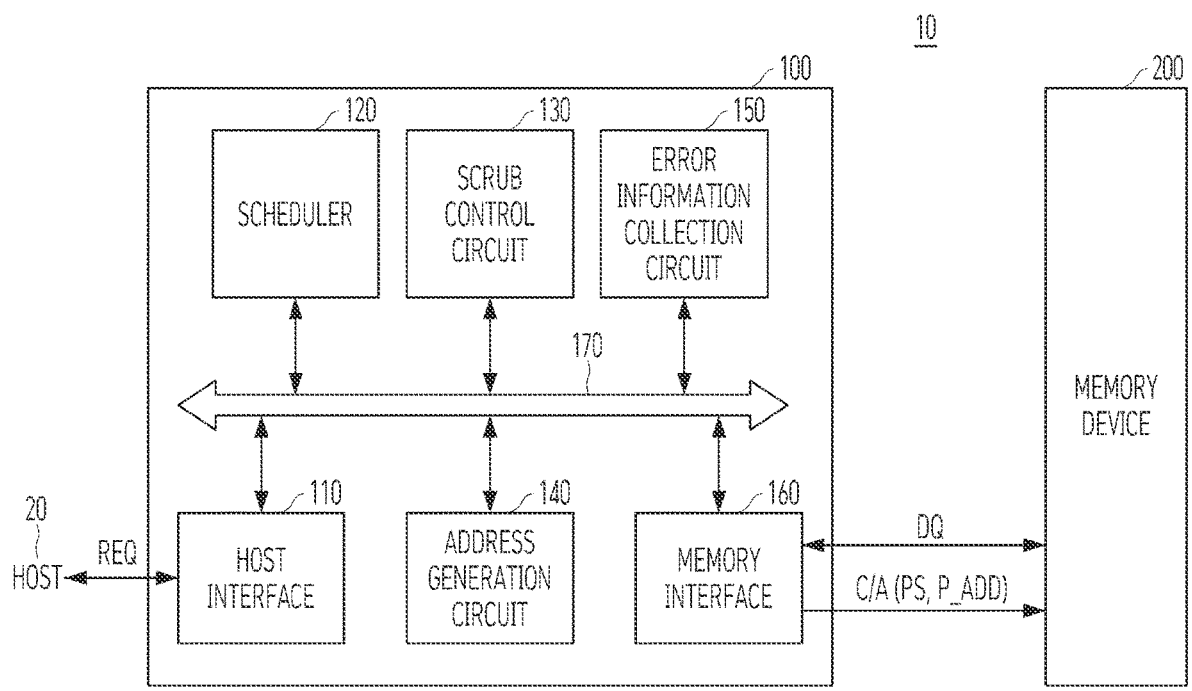
FIG. 1 is a block diagram illustrating a memory system according to an embodiment of the present disclosure.

Various embodiments of the present disclosure will be described below in more detail with reference to the accompanying drawings. The embodiments of the present disclosure may, however, be in different forms and should not be construed as limited to the embodiments set forth herein. Rather, these embodiments are provided so that this disclosure will be thorough and complete, and will fully convey the scope of the present disclosure to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

FIG. 1 is a block diagram illustrating a memory system 10 according to an embodiment of the present disclosure.

Referring to FIG. 1, the memory system 10 may include a memory controller 100 and a memory device 200.

The memory controller 100 may control operations of the memory system 10 and control data transfer between a host 20 and the memory device 200. The memory controller 100 may generate a command/address signal C/A according to a request REQ from the host 20 and provide the generated command/address signal C/A to the memory device 200. The memory controller 100 may provide data DQ corresponding to the request REQ from the host 20 to the memory device 200, and provide the data DQ read from the memory device 200 to the host 20.

The memory device 200 may be a dynamic random access memory (DRAM), a double data rate 4 (DDR4) synchronous DRAM (SDRAM), a DDR5 SDRAM, a low power DDR4 (LPDDR4) SDRAM, or an LPDDR5 SDRAM, each including dynamic memory cells. The memory device 200 may include a memory cell area in which a plurality of memory cells coupled to a plurality of rows and a plurality of columns are arranged in an array.

The host 20 may include a central processing unit (CPU), a graphic processing unit (GPU), an application processor (AP), and the like. The memory controller 100 may be included in a CPU, a GPU, an AP, or the like, and in this case, the host 20 may represent a configuration other than the memory controller 100 in these configurations. For example, when the memory controller 100 is included in a CPU, the host 20 may represent the remaining components in the CPU except the memory controller 100.

In detail, the memory controller 100 may include a host interface 110, a scheduler 120, a scrub control circuit 130, an address generation circuit 140, an error information collection circuit 150, a memory interface 160, and a bus 170.

The host interface 110 may be an interface for communication between the host 20 and the memory controller 100. The host interface 110 may receive the request REQ from the host 20, receive the data DQ read from the memory device 200 through the memory interface 160, and transfer the received data DQ to the host 20.

The scheduler 120 may receive the request REQ from the host 20 through the host interface 110. The scheduler 120 may generate various commands, e.g., an active command, a precharge command, a read command, a write command, an error information request command, etc., according to the request REQ. The scheduler 120 may set the order of requests to be instructed to the memory device 200 among the requests REQs from the host 20 and generate a command to be applied to the memory device 200 according to the order of the predetermined operations. To improve the performance of the semiconductor memory device 200, the scheduler 120 may change the order in which the requests REQs are received from the host 20 and the order of the operations to be instructed to the memory device 200. For example, the scheduler 120 may adjust the order so that a write operation is performed before a read operation, even if the host 20 requests the read operation of the semiconductor memory device 200 first and the write operation later.

The scrub control circuit 130 may generate a scrub command PS indicating a scrub operation for a predetermined number of times during a scrub period. For example, the scrub control circuit 130 may generate the scrub command PS for the number of times to check errors of all memory cells of the memory device 200. The number of times to check errors of all memory cells may be set according to the number of the plurality of rows and/or the plurality of columns. The scrub operation may include a read operation for reading data from the memory device 200, an error check operation for checking and correcting an error in the read data, and a re-write operation for writing the error-corrected data back to the memory device 200. The scrub control circuit 130 may transmit the scrub command PS indicating a read operation and a re-write operation to the memory device 200, but internally perform an error check operation. For example, the scrub control circuit 130 may control a re-write operation to be performed when a correctable error (CE) is detected according to the error check operation, and generate error check information about a location where an uncorrectable error (UE) exists when the UE is detected according to the error check operation.

The address generation circuit 140 may generate a normal address corresponding to the command generated by the scheduler 120 according to the request REQ provided from the host 20 through the host interface 110. Furthermore, the address generation circuit 140 may generate a scrub address P_ADD according to the scrub command PS generated by the scrub control circuit 130. The address generation circuit 140 may generate the scrub address P_ADD having a value sequentially increased according to the scrub command PS. According to an embodiment, the address generation circuit 140 may generate the scrub address P_ADD having a value sequentially decreased according to the scrub command PS. The normal address and the scrub address P_ADD may include a row address designating the plurality of rows, a column address designating the plurality of columns, and the like.

The error information collection circuit 150 may log a detected error during the error check operation of the scrub control circuit 130. That is, the error information collection circuit 150 may store and update log information corresponding to result data (i.e., the error check information) of the scrub operation, and output the stored log information to the host 20 according to the request REQ from the host 20.

The memory interface 160 may be configured to communicate with the memory device 200. For example, the memory interface 160 may transmit the command/address signal C/A and the data DQ to the memory device 200, and receive the data DQ read from the memory device 200. The memory interface 160 may receive the normal address generated from the address generation circuit 140 together with the command issued from the scheduler 120 to provide the command/address signal C/A to the memory device 200, and receive the scrub address P_ADD generated from the address generation circuit 140 together with the scrub command PS generated from the scrub control circuit 130 to provide the command/address signal C/A to the memory device 200. Also, the memory interface 160 may provide the data DQ corresponding to the request REQ provided from the host interface 110 to the memory device 200.

The scheduler 120 may transmit data between the host interface 110, the scrub control circuit 130, the address generation circuit 140, the error information collection circuit 150 and the memory interface 160 via the bus 170. According to an embodiment, the host interface 110, the scheduler 120, the scrub control circuit 130, the address generation circuit 140, the error information collection circuit 150 and the memory interface 160 may communicate with each other independently without passing through the bus 170. For example, the scrub control circuit 130 and the host interface 110 may communicate directly with each other without passing through the bus 170. The scrub control circuit 130 and the memory interface 160 may communicate with each other directly without passing through the bus 170. The host interface 110 and the memory interface 160 may also communicate directly with each other without passing through the bus 170.

The memory device 200 may perform an active operation, a precharge operation, a write operation and a read operation according to the command/address signal C/A and/or the data DQ that are provided from the memory controller 100. For example, the memory device 200 may perform an active operation of activating a row corresponding to a row address, among the plurality of rows, according to an active command, and perform a precharge operation of deactivating (or precharging) the activated row according to a precharge command. The memory device 200 may perform a read operation of reading data of memory cells connected between a row selected by the row address, among the plurality of rows, and a column selected by a column address, among the plurality of columns, according to a read command, and perform a write operation of writing the data DQ to memory cells according to a write command.

Further, the memory device 200 may perform a scrub operation on memory cells connected between a row and a column selected by the scrub address P_ADD, according to the scrub command PS. The memory device 200 may perform the scrub operation including a read operation for reading data of the selected memory cells and providing the read data to the memory controller 100, and/or a re-write operation for writing error-corrected data provided from the memory controller 100 back to the selected memory cells. In the following description, an active operation, a precharge operation, a write operation, a read operation, etc. excluding the scrub operation will be defined as a normal operation.

Figure 2:
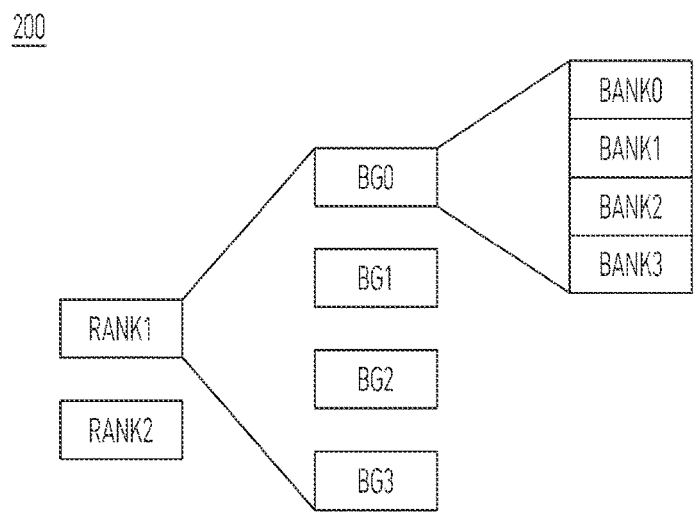
FIG. 2 is a diagram schematically illustrating a configuration of a memory device of FIG. 1.

Referring to FIG. 2, the memory device 200 may include a plurality of ranks (e.g., first and second ranks RANK1 and RANK2) communicating independently with the memory controller 100. Each of the first and second ranks RANK1 and RANK2 includes a plurality of bank groups (e.g., first to fourth bank groups BG0 to BG3), and each of the bank groups BG0 to BG3 may include a plurality of banks (e.g., first to fourth banks BANK0 to BANK3). Each of the first to fourth banks BANK0 to BANK3 may include a plurality of rows accessed by a row address and a plurality of columns accessed a column address. As illustrated in FIG. 2, when the memory device 200 has a rank-bank group-bank structure, the normal address and the scrub address P_ADD may further include a bank related address and other addresses in addition to the row address and column address. The bank related address includes bank information such as a bank group address that distinguishes bank groups and a bank address that distinguishes banks, and the other addresses may include at least one of rank information, channel information allocated to each rank, and slot information on which ranks are mounted.

FIGS. 3A to 3D are diagrams illustrating a configuration of the scrub address P_ADD generated by the address generation circuit 140 according to an embodiment of the present disclosure.

Figure 3A:
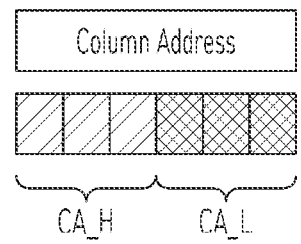
FIGS. 3A to 3D are diagrams illustrating a configuration of a scrub address generated by an address generation circuit according to an embodiment of the present disclosure.

Referring to FIG. 3A, the address generation circuit 140 may divide bits of a column address CA into a first column bit group CA_L and a second column bit group CA_H. For example, the address generation circuit 140 may define lower bits including a least significant bit (LSB) of the column address CA as the first column bit group CA_L, and define upper bits including a most significant bit (MSB) of the column address CA as the second column bit group CA_H. The memory device 200 may divide a plurality of columns into a plurality of column groups, select one of the column groups according to the second column bit group CA_H, and select one of the columns of the selected column group according to the first column bit group CA_L.

Figure 3B:
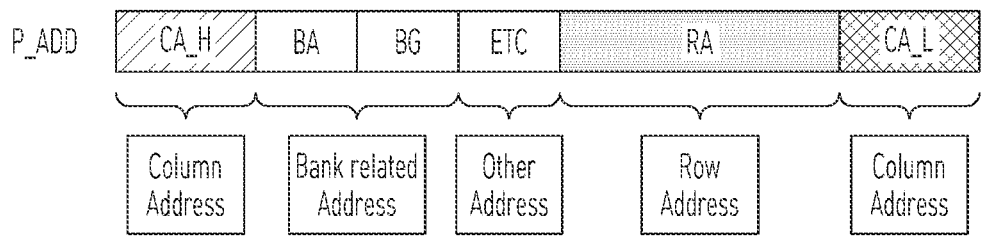
Figure 3C:
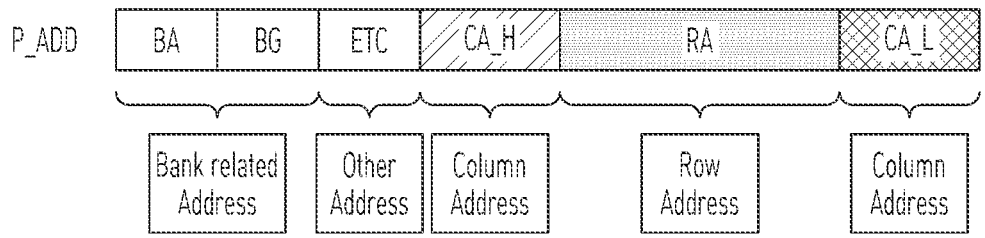
Figure 3D:
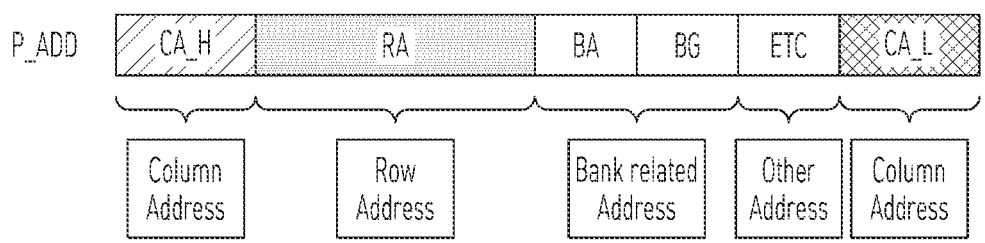

Referring to FIGS. 3B to 3D, the address generation circuit 140 may generate the scrub address P_ADD having an address sequence in which the first column bit group CA_L, a row address RA, and the second column bit group CA_H are sequentially allocated from an LSB. That is, the address generation circuit 140 may divide the column address CA into two bit groups, and configure the first column bit group CA_L of the column address CA to be allocated to lower bits including the LSB of the scrub address P_ADD, and configure the row address RA to be allocated between the first column bit group CA_L and the second column bit group CA_H.

Referring to FIG. 3B, the address generation circuit 140 may allocate a bank related address including a bank address BA and a bank group address BG, between the second column bit group CA_H and the row address RA. The address generation circuit 140 may allocate the second column bit group CA_H to upper bits including the MSB of the scrub address P_ADD. Furthermore, the address generation circuit 140 may allocate other addresses ETC including at least one of rank information, channel information, and slot information, between the bank related address and the row address RA. That is, the address generation circuit 140 may generate the scrub address P_ADD having an address sequence in which the first column bit group CA_L, the row address RA, the other addresses ETC, the bank group address BG, the bank address BA, and the second column bit group CA_H are sequentially allocated from the LSB. According to an embodiment, the address generation circuit 140 may allocate the other addresses ETC between the second column bit group CA_H and the bank related address.

Referring to FIG. 3C, the address generation circuit 140 may allocate the bank address BA and the bank group address BG to bits upper than bits where the second column bit group CA_H is allocated. That is, the address generation circuit 140 may allocate the bank address BA and the bank group address BG to upper bits than the second column bit group CA. Furthermore, the address generation circuit 140 may allocate the other addresses ETC between the bank related address and the second column bit group CA_H. That is, the address generation circuit 140 may generate the scrub address P_ADD having an address sequence in which the first column bit group CA_L, the row address RA, the second column bit group CA_H, the other addresses ETC, the bank group address BG, and the bank address BA are sequentially allocated from the LSB. According to an embodiment, the address generation circuit 140 may allocate the other addresses ETC to upper bits than the bank related address.

Referring to FIG. 3D, the address generation circuit 140 may allocate the bank address BA and the bank group address BG, between the row address RA and the first column bit group CA_L. Furthermore, the address generation circuit 140 may allocate the other addresses ETC between the bank related address and the first column bit group CA_L. That is, the address generation circuit 140 may generate the scrub address P_ADD having an address sequence in which the first column bit group CA_L, the other addresses ETC, the bank group address BG, the bank address BA, the row address RA, and the second column bit group CA_H are sequentially allocated from the LSB. According to an embodiment, the address generation circuit 140 may allocate the other addresses ETC between the row address RA and the bank related address.

Hereinafter, a reason for configuring the scrub address P_ADD according to an embodiment of the present disclosure will be described with reference to the drawings. Hereinafter, for convenience of description, a case in which the scrub address P_ADD includes only the row address RA and the column address CA will be described as an example.

Figure 4B:
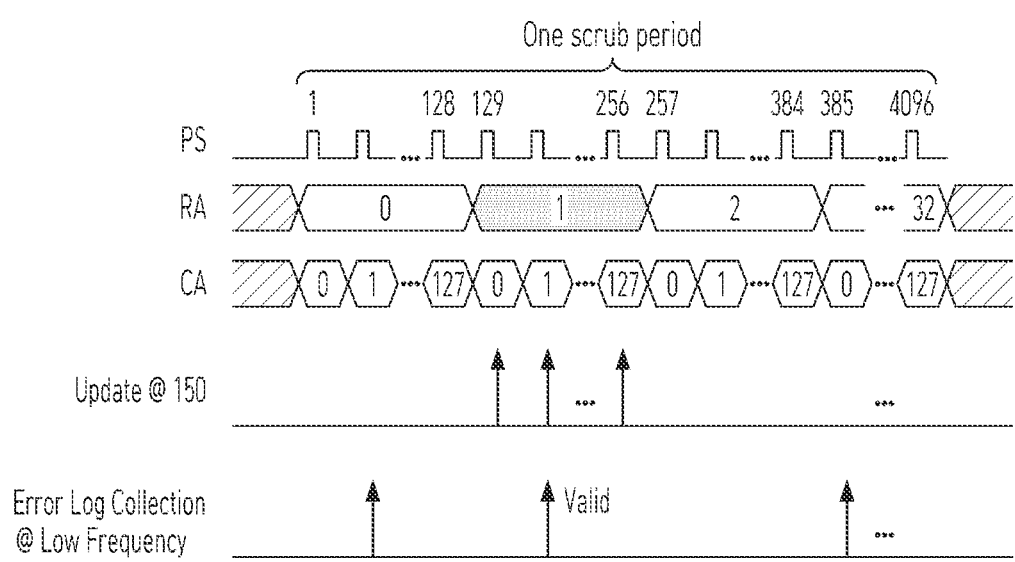

FIGS. 4A and 4B are diagrams for describing a scrub operation according to one type of memory system that has been proposed.

Referring to FIG. 4A, the address generation circuit 140 may generate a scrub address P_ADD having an address sequence in which a column address CA and a row address RA are sequentially allocated from the LSB. For example, when the column address CA is composed of 7 bits and the row address RA is composed of 5 bits, the address generation circuit 140 may sequentially increase the value of the scrub address P_ADD by "1" from "00000 0000000" to "11111 1111111" according to a scrub command PS.

Referring to FIG. 4B, during one scrub period, the memory controller 100 provides a scrub address P_ADD from "00000 0000000" to "11111 1111111" to the memory device 200 with 4096 scrub commands PS.

The memory device 200 may sequentially perform the scrub operations on 128 columns corresponding to the column address CA from "0000000" to "1111111" while selecting a first row corresponding to the row address RA of "00000", in response to the 128 scrub commands PS. Each scrub operation may include a read operation in which the memory device 200 reads data from selected memory cells connected to a selected row and a selected column, an error check operation in which the memory controller 100 checks and corrects errors in the read data, and a re-write operation in which the memory device 200 writes the error-corrected data back to the selected memory cells. In addition, the memory device 200 may sequentially perform the scrub operations on 128 columns corresponding to the column address CA from "0000000" to "1111111" while selecting a second row corresponding to the row address RA of "00001", in response to the next 128 scrub commands PS.

That is, the memory controller 100 may check errors of all memory cells by selecting one row, sequentially performing scrub operations on memory cells connected to the selected row, selecting the next row, and sequentially performing scrub operations on all memory cells connected to the selected row. The error information collection circuit 150 may store and update log information based on error check information. The host 20 requests the log information stored in the error information collection circuit 150 using a polling or interrupt-based manner, and the error information collection circuit 150 may output the log information to the host 20 according to the request of the host 20, thereby completing error log collection.

In FIG. 4B, row-fault errors have occurred intensively in the first row. In the scrub operations for the first row, the error information collection circuit 150 performs an update operation with a high frequency, but when the error log collection of the host 20 is performed with a low frequency, valid log information about the row-fault errors may be lost. Considering that the row-fault errors have a high possibility of generating uncorrectable errors (UE), such information loss may be a main factor for deteriorating performance of the system.

FIGS. 5A and 5B are diagrams for describing a scrub operation according to an embodiment of the present disclosure.

Referring to FIG. 5A, when a column address CA is formed of 7 bits and a row address RA is formed of 5 bits, the address generation circuit 140 may divide the lower 4 bits of the column address CA into a first column bit group CA_L, and divide the upper 3 bits into a second column bit group CA_H. 8 column groups may be classified according to the second column bit group CA_H of the 3 bits, and 16 columns of each column group may be classified according to the first column bit group CA_L of the 4 bits. The address generation circuit 140 may generate a scrub address P_ADD having an address sequence in which the first column bit group CA_L, the row address RA, and the second column bit group CA_H are sequentially allocated from the LSB. The address generation circuit 140 may sequentially increase a value of the scrub address P_ADD by "1" from "000 00000 0000" to "111 11111 1111" according to a scrub command PS.

Referring to FIG. 5B, during one scrub period, the memory controller 100 provides a scrub address P_ADD from "000 00000 0000" to "111 11111 1111" to the memory device 200 with 4096 scrub commands PS.

The memory device 200 may sequentially perform the scrub operations on 16 columns corresponding to the first column bit group CA_L from "0000" to "1111" while selecting a first row corresponding to the row address RA of "00000" and a first column group corresponding to the second column bit group CA_H of "000", in response to the 16 scrub commands PS. Furthermore, the memory device 200 may sequentially perform the scrub operations on 16 columns corresponding to the first column bit group CA_L from "0000" to "1111" while selecting a second row corresponding to the row address RA of "00001" and the first column group, in response to the next 16 scrub commands PS. As a result, in response to 512 scrub commands PS, the scrub operations may be sequentially performed on all columns and all rows included in one column group.

That is, the memory controller 100 may check errors of all memory cells by selecting one column group, and sequentially performing scrub operations on all columns included in the selected column group while sequentially changing the rows. The error information collection circuit 150 may store and update log information based on error check information.

At this time, even if row-fault errors occur intensively in the first row, the error information collection circuit 150 may perform an update operation at a relatively low frequency because the scrub operations for the first row are distributed and performed for each column group. Accordingly, in an embodiment of the present disclosure, even if the error log collection of the host 20 is performed at a low frequency, loss of log information about the row-fault errors may be prevented.

Hereinafter, an operation of the memory system 10 according to an embodiment of the present disclosure will be described with reference to the drawings.

Figure 6:
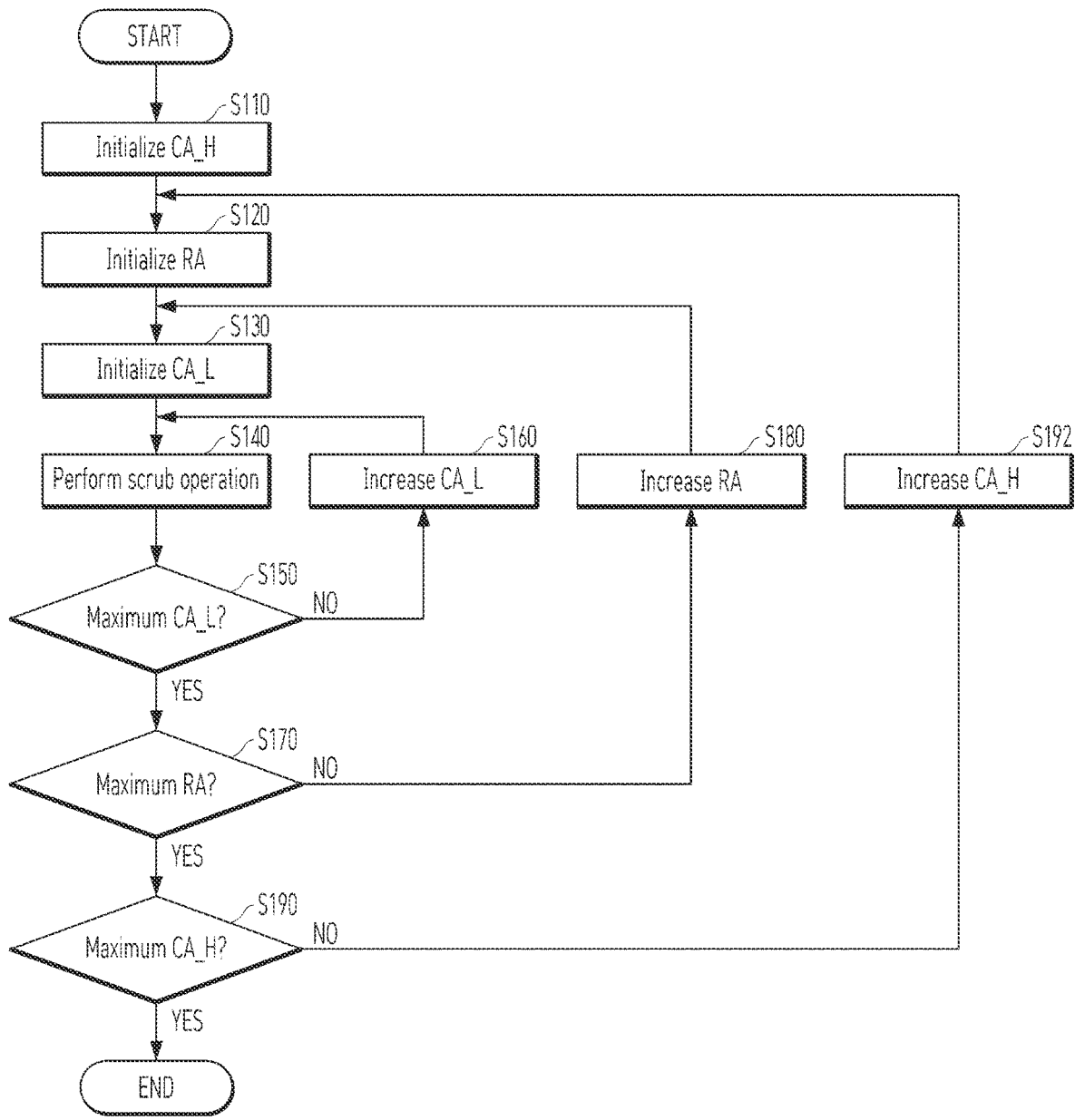
FIG. 6 is a flowchart illustrating an operation of a memory system according to an embodiment of the present disclosure.
Figure 7B:
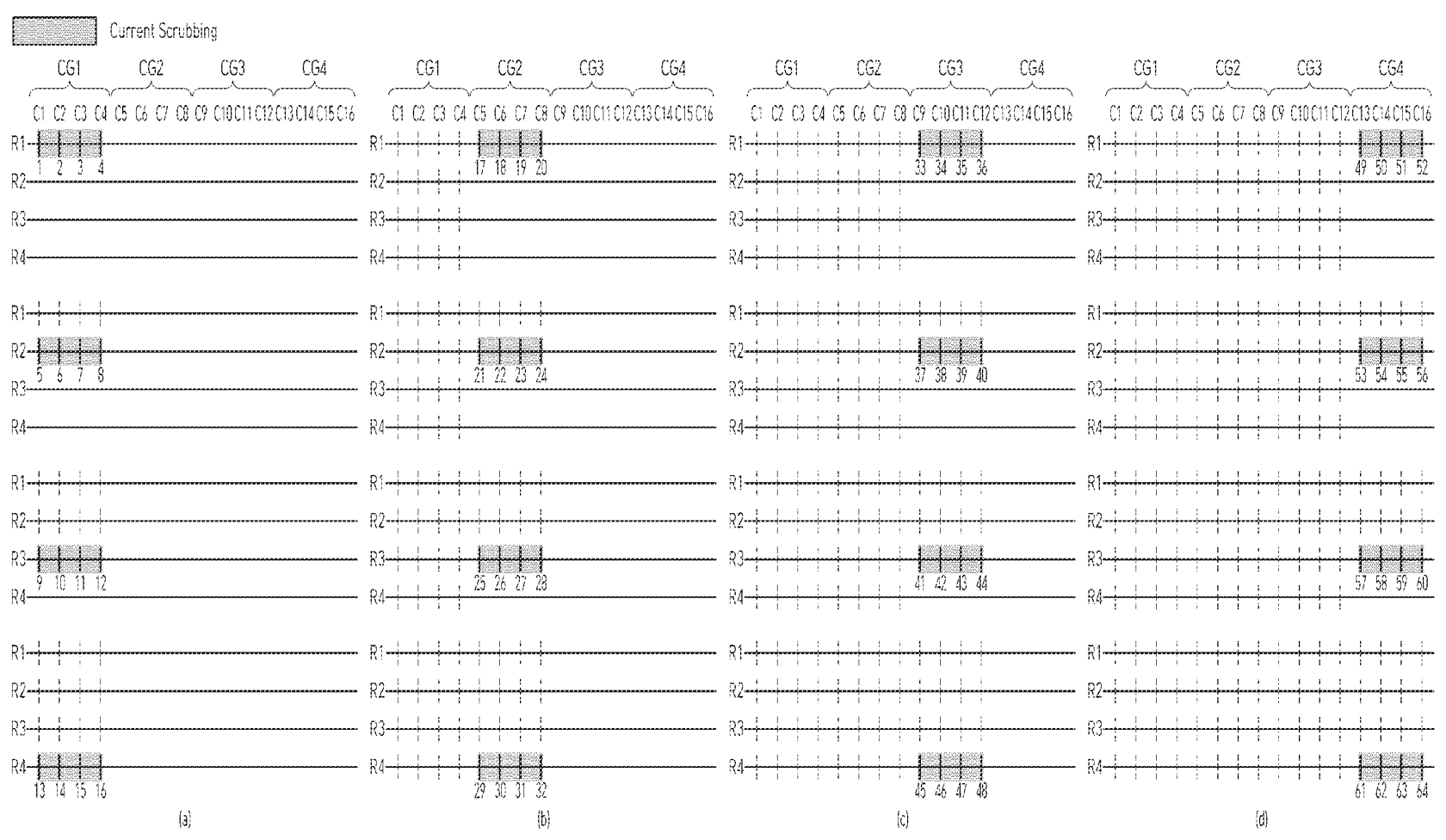

FIG. 6 is a flowchart illustrating an operation of the memory system 10 according to an embodiment of the present disclosure. FIGS. 7A and 7B are diagrams for helping understanding of the operation of FIG. 6. In FIGS. 7A and 7B, for convenience of description, a case where first to fourth rows R1 to R4 and first to sixteenth columns C1 to C16 are disposed, and the first to sixteenth columns C1 to C16 are divided into first to fourth column groups CG1 to CG4 will be described as an example.

Referring to FIG. 6, the address generation circuit 140 may initialize a scrub address P_ADD as a scrub period starts (at operation S110, at operation S120, and at operation S130). That is, the address generation circuit 140 may initialize all of a first column bit group CA_L of a column address CA, a row address RA, and a second column bit group CA_H of a column address CA.

According to a scrub command PS generated by the scrub control circuit 130, a scrub operation may be performed on memory cells corresponding to the scrub address P_ADD (at operation S140). Thereafter, the address generation circuit 140 may increase a value of the first column bit group CA_L of the column address CA by "1" (at operation S160), and a scrub operation may be performed on memory cells corresponding to the scrub address P_ADD according to the scrub command PS (at operation S140). Until the first column bit group CA_L reaches a maximum value ("NO" of operation S150), the operations S140 to S160 may be repeatedly performed. Accordingly, the scrub operations may be sequentially performed on the first row R1 and all columns C1 to C4 included in the first column group CG1.

When the first column bit group CA_L reaches a maximum value ("YES" of operation S150), the address generation circuit 140 may increase a value of the row address RA by "1" (at operation S180), and initialize the first column bit group CA_L (at operation S130). A scrub operation may be performed on memory cells corresponding to the scrub address P_ADD according to the scrub command PS (at operation S140). Until the row address RA reaches a maximum value ("NO" of operation S170), the operations S130 to S180 may be repeatedly performed. Accordingly, as shown in (a) of FIGS. 7A and 7B, the scrub operations may be sequentially performed on all rows R1 to R4 and all columns C1 to C4 included in the first column group CG1 in response to the 16 scrub commands PS.

When both the first column bit group CA_L and the row address RA reach a maximum value ("YES" of operation S150 & "YES" of operation S170), the address generation circuit 140 may increase a value of the second column bit group CA_H of the column address CA by "1" (at operation S192), and initialize all of the first column bit group CA_L and the row address RA (at operation S120 and at operation S130). A scrub operation may be performed on memory cells corresponding to the scrub address P_ADD according to the scrub command PS (at operation S140). Until the second column bit group CA_H reaches a maximum value ("NO" of operation S190), the operations S120 to S192 may be repeatedly performed. Accordingly, as shown in (b) of FIGS. 7A and 7B, the scrub operations may be sequentially performed on all rows R1 to R4 and all columns C5 to C8 included in the second column group CG2 in response to the 16 scrub commands PS, and as shown in (c) of FIGS. 7A and 7B, the scrub operations may be sequentially performed on all rows R1 to R4 and all columns C9 to C12 included in the third column group CG3 according to the 16 scrub commands PS, and as shown in (d) of FIGS. 7A and 7B, the scrub operations may be sequentially performed on all rows R1 to R4 and all columns C13 to C16 included in the fourth column group CG4.

When the second column bit group CA_H reaches a maximum value ("YES" of operation S190), the scrub operations in the scrub period may be completed.

As described above, in an embodiment of the present disclosure, the memory system 10 may check the errors of all memory cells by generating the scrub address P_ADD sequentially increasing from the LSB according to the scrub command PS, selecting one column group according to the scrub command PS and the scrub address P_ADD, and performing scrub operations on all columns included in the selected column group while sequentially changing the row.

In the above embodiment, the memory controller 100 generates the scrub address P_ADD sequentially increasing from the LSB according to the scrub command PS, but the embodiments of the present disclosure are not limited thereto. Depending on an embodiment, the address generation circuit 140 may generate a scrub address P_ADD having a value sequentially decreasing from a maximum value according to a scrub command PS. Depending on embodiment, the address generation circuit 140 may increase a value of at least one of a first column bit group CA_L, a row address RA, and a second column bit group CA_H included in a scrub address P_ADD according to a scrub command PS and decrease the remaining values.

Also, in the above embodiment, a case where the value of the scrub address P_ADD is increased by "1" according to the scrub command PS has been described as an example, but the embodiments of the present disclosure are not limited thereto. For example, in the operations S160, S180, and S192 of FIG. 6, the first column bit group CA_L and the address generation circuit 140 may increase the row address RA and the second column bit group CA_H by "k", respectively, where k is a positive integer equal to or greater than 2.

Hereinafter, various address sequences for generating the scrub address P_ADD will be described.

Figure 8B:
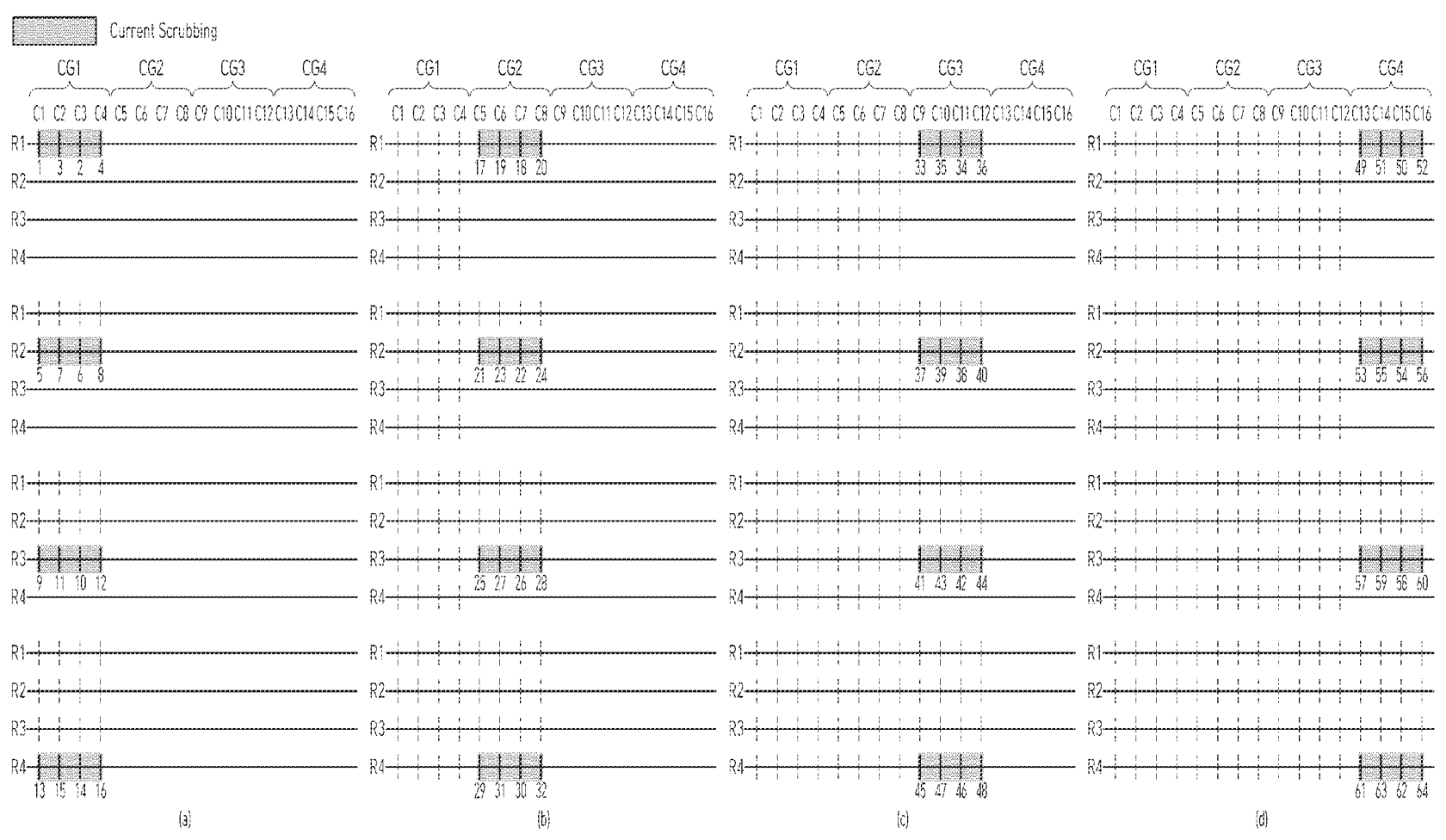

FIGS. 8A and 8B are diagrams for describing a scrub operation according to another embodiment of the present disclosure.

Referring to FIG. 8A, the address generation circuit 140 may increase a value of a first column bit group CA_L by "2" in operation S160 of FIG. 6. The address generation circuit 140 may set an initial value of the first column bit group CA_L to "O" and increase the initial value by "2" to sequentially select odd columns C1 and C3, and when the first column bit group CA_L reaches a maximum value, the initial value is set to "1" and increases the initial value by "2" to sequentially select even columns C2 and C4.

Accordingly, scrub operations are performed on all rows R1 to R4 and all columns C1 to C4 included in a first column group CG1 in response to 16 scrub commands PS, as shown in (a) of FIGS. 8A and 8B, scrub operations are performed on all rows R1 to R4 and all columns C5 to C8 included in a second column group CG2 in response to 16 scrub commands PS, as shown in (b) of FIGS. 8A and 8B, scrub operations are performed on all rows R1 to R4 and all columns C9 to C12 included in a third column group CG3 in response to 16 scrub commands PS, as shown in (c) of FIGS. 8A and 8B, and scrub operations are performed on all rows R1 to R4 and all columns C13 to C16 included in a fourth column group CG4 in response to 16 scrub commands PS, as shown in (d) of FIGS. 8A and 8B.

As described above, the address generation circuit 140 may increase the values of the row address RA and the second column bit group CA_H in the scrub address P_ADD by "1", while increasing the value of the first column bit group CA_L by "k" according to the scrub command PS, where k is a positive integer equal to or greater than 2.

Figure 9B:
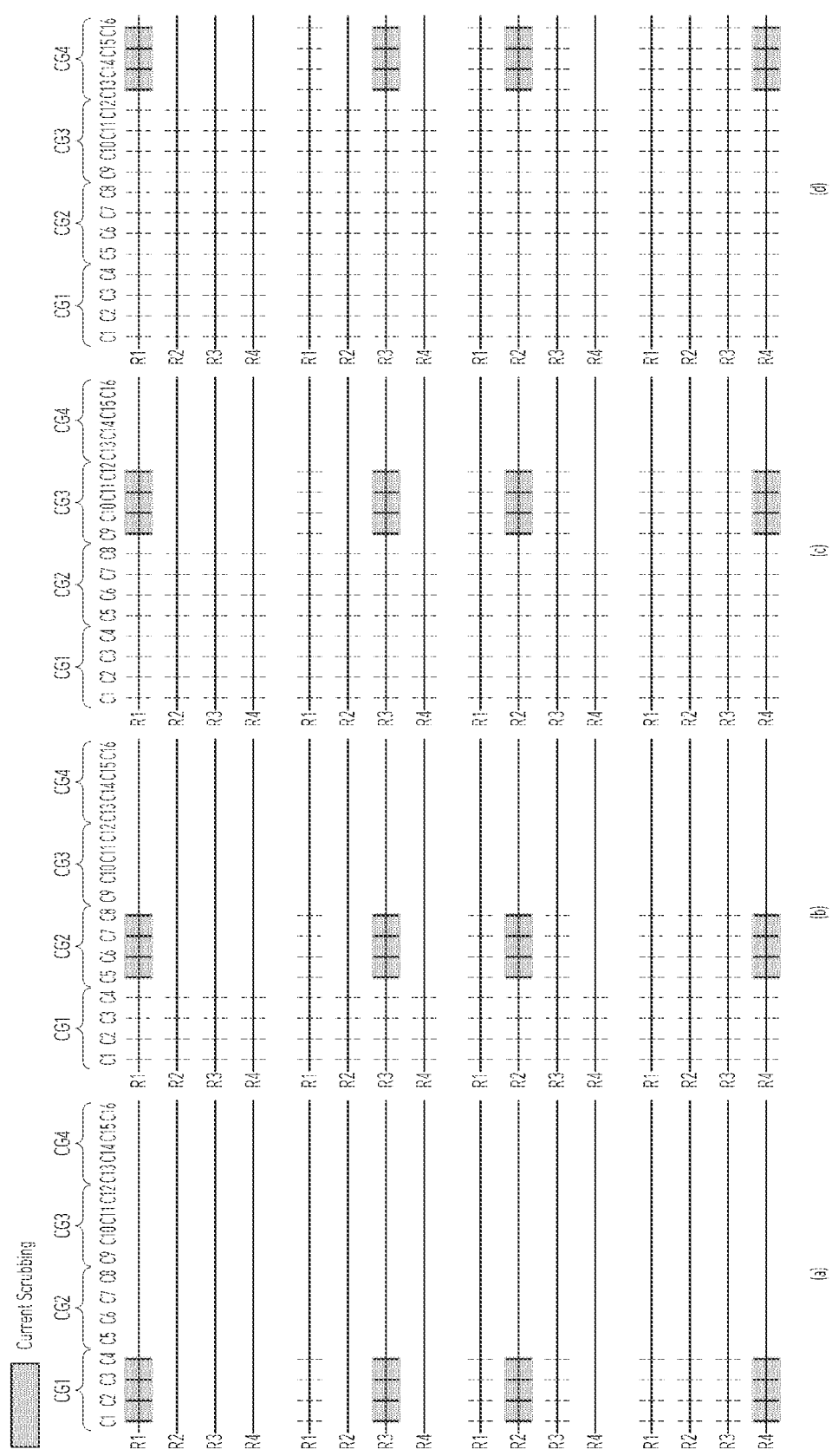

FIGS. 9A and 9B are diagrams for describing a scrub operation according to another embodiment of the present disclosure.

Referring to FIG. 9A, the address generation circuit 140 may increase a value of a row address RA by "2" in operation S180 of FIG. 6. The address generation circuit 140 may set an initial value of the row address RA to "O" and increase the initial value by "2" to sequentially select odd rows R1 and R3, and when the row address RA reaches a maximum value, the initial value is set to "1" and increases the initial value by "2" to sequentially select even rows R2 and R4.

Accordingly, scrub operations are performed on all rows R1 to R4 and all columns C1 to C4 included in a first column group CG1 in response to 16 scrub commands PS, as shown in (a) of FIGS. 9A and 9B, scrub operations are performed on all rows R1 to R4 and all columns C5 to C8 included in a second column group CG2 in response to 16 scrub commands PS, as shown in (b) of FIGS. 9A and 9B, scrub operations are performed on all rows R1 to R4 and all columns C9 to C12 included in a third column group CG3 in response to 16 scrub commands PS, as shown in (c) of FIGS. 9A and 9B, and scrub operations are performed on all rows R1 to R4 and all columns C13 to C16 included in a fourth column group CG4 in response to 16 scrub commands PS, as shown in (d) of FIGS. 9A and 9B.

As described above, the address generation circuit 140 may increase the values of the first column bit group CA_L and the second column bit group CA_H in the scrub address P_ADD by "1", while increasing the value of the row address RA by "k" according to the scrub command PS, where k is a positive integer equal to or greater than 2.

Figure 10B:
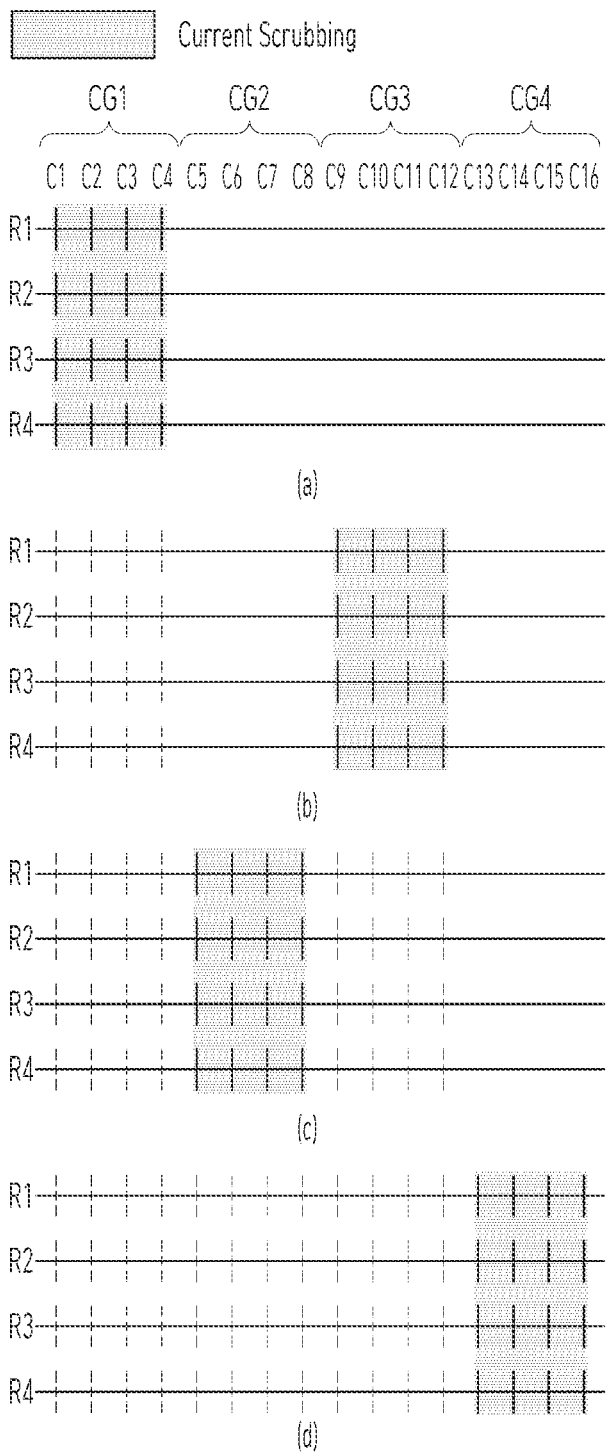

FIGS. 10A and 10B are diagrams for describing a scrub operation according to another embodiment of the present disclosure.

Referring to FIG. 10A, the address generation circuit 140 may increase a value of a second column bit group CA_H by "2" in operation S192 of FIG. 6. The address generation circuit 140 may set an initial value of the second column bit group CA_H to "0" and increase the initial value by "2" to sequentially select odd column groups CG1 and CG3, and when the second column bit group CA_H reaches a maximum value, the initial value is set to "1" and increases the initial value by "2" to sequentially select even column groups CG2 and CG4.

Accordingly, scrub operations are performed on all rows R1 to R4 and all columns C1 to C4 included in the first column group CG1 in response to 16 scrub commands PS, as shown in (a) of FIGS. 10A and 10B, scrub operations are performed on all rows R1 to R4 and all columns C9 to C12 included in the third column group CG3 in response to 16 scrub commands PS, as shown in (b) of FIGS. 10A and 10B, scrub operations are performed on all rows R1 to R4 and all columns C5 to C8 included in the second column group CG2 in response to 16 scrub commands PS, as shown in (c) of FIGS. 10A and 10B, and scrub operations are performed on all rows R1 to R4 and all columns C13 to C16 included in the fourth column group CG4 in response to 16 scrub commands PS, as shown in (d) of FIGS. 10A and 10B.

As described above, the address generation circuit 140 may increase the values of the first column bit group CA_L and the row address RA in the scrub address P_ADD by "1", while increasing the value of the second column bit group CA_H by "k" according to the scrub command PS, where k is a positive integer equal to or greater than 2.

In the above embodiments, a case where a bank related address and other addresses are continuously allocated has been described, but the embodiments of the present disclosure are not limited thereto.

FIGS. 11A to 11F are diagrams illustrating a configuration of a scrub address P_ADD generated by the address generation circuit 140 according to another embodiment of the present disclosure.

Figure 11A:
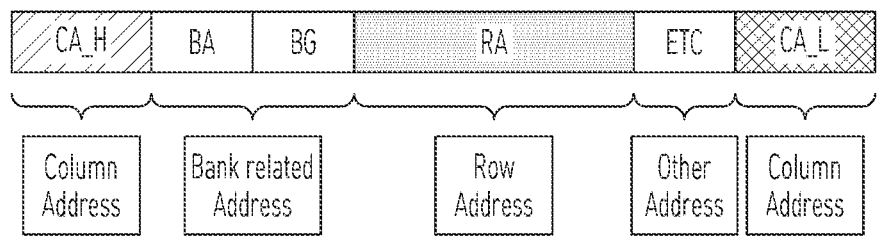
FIGS. 11A to 11F are diagrams illustrating a configuration of a scrub address generated by an address generation circuit according to another embodiment of the present disclosure.

Referring to FIG. 11A, the address generation circuit 140 may allocate a bank related address including a bank address BA and a bank group address BG, between a second column bit group CA_H and a row address RA, and allocate other addresses ETC between the row address RA and a first column bit group CA_L. That is, the address generation circuit 140 may generate a scrub address P_ADD having an address sequence in which the first column bit group CA_L, the other addresses ETC, the row address RA, the bank group address BG, the bank address BA, and the second column bit group CA_H are sequentially allocated from the LSB.

Figure 11B:
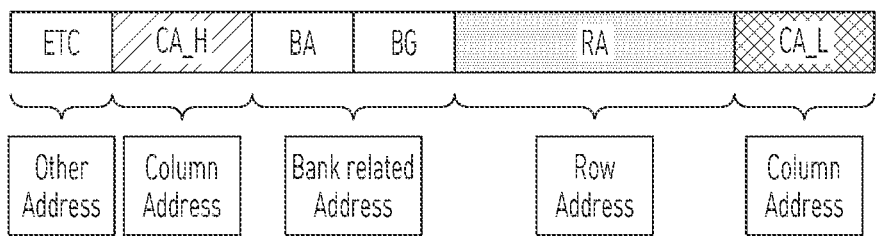

Referring to FIG. 11B, the address generation circuit 140 may allocate a bank related address between a second column bit group CA_H and a row address RA, and allocate other addresses ETC to bits upper than bits where the second column bit group CA_H is allocated. That is, the address generation circuit 140 may allocate the other addresses ETC to upper bits than the second column bit group CA_H. Thus, the address generation circuit 140 may generate a scrub address P_ADD having an address sequence in which the first column bit group CA_L, the row address RA, the bank group address BG, the bank address BA, the second column bit group CA_H, and the other addresses ETC are sequentially allocated from the LSB.

Figure 11C:
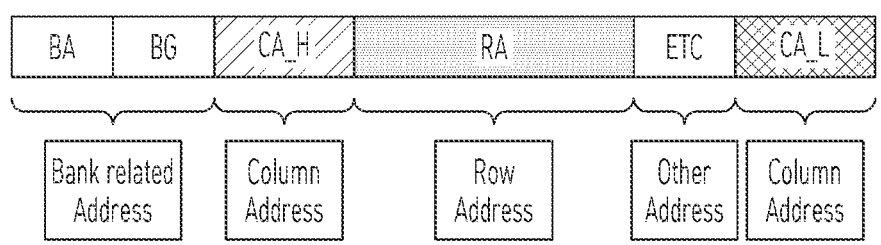

Referring to FIG. 11C, the address generation circuit 140 may allocate a bank related address to bits upper than bits where a second column bit group CA_H is allocated, and allocate other addresses ETC between a row address RA and a first column bit group CA_L. That is, the address generation circuit 140 may allocate the bank related address to upper bits than the second column bit group CA_H. Thus, the address generation circuit 140 may generate a scrub address P_ADD having an address sequence in which the first column bit group CA_L, the other addresses ETC, the row address RA, the second column bit group CA_H, the bank group address BG, and the bank address BA are sequentially allocated from the LSB.

Figure 11D:
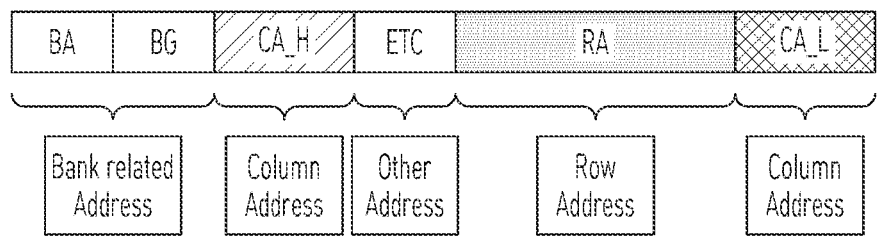

Referring to FIG. 11D, the address generation circuit 140 may allocate a bank related address to bits upper than bits where a second column bit group CA_H is allocated, and allocate other addresses ETC between the second column bit group CA_H and a row address RA. That is, the address generation circuit 140 may allocate the bank related address to upper bits than the second column bit group CA_H. Thus, the address generation circuit 140 may generate a scrub address P_ADD having an address sequence in which the first column bit group CA_L, the row address RA, the other addresses ETC, the second column bit group CA_H, the bank group address BG, and the bank address BA are sequentially allocated from the LSB.

Figure 11E:
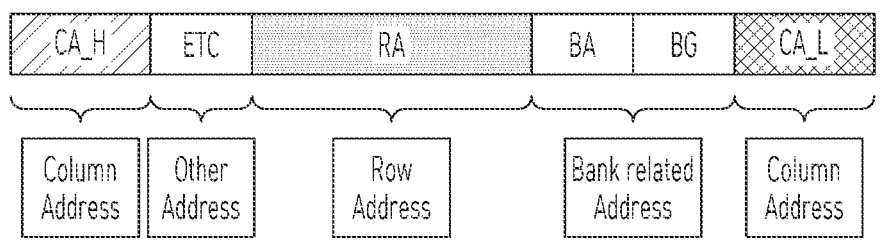

Referring to FIG. 11E, the address generation circuit 140 may allocate a bank related address between a row address RA and a first column bit group CA_L, and allocate other addresses ETC between a second column bit group CA_H and the row address RA. That is, the address generation circuit 140 may generate a scrub address P_ADD having an address sequence in which the first column bit group CA_L, the bank group address BG, the bank address BA, the row address RA, the other addresses ETC, and the second column bit group CA_H are sequentially allocated from the LSB.

Figure 11F:
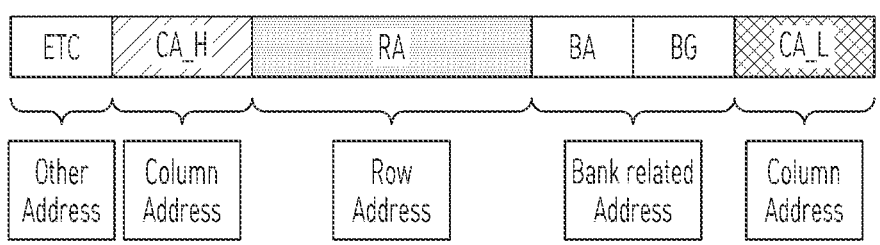

Referring to FIG. 11F, the address generation circuit 140 may allocate a bank related address between a row address RA and a first column bit group CA_L, and allocate other addresses ETC to bits upper than bits where a second column bit group CA_H is allocated, that is, to upper bits than the second column bit group CA_H. Thus, the address generation circuit 140 may generate a scrub address P_ADD having an address sequence in which the first column bit group CA_L, the bank group address BG, the bank address BA, the row address RA, the second column bit group CA_H, and the other addresses ETC are sequentially allocated from the LSB.

In the above embodiments, a case where lower bits and upper bits of a column address CA are divided into a first column bit group CA_L and a second column bit group CA_H, respectively, has been described, but the embodiments of the present disclosure are not limited thereto. According to an embodiment, the address generation circuit 140 may divide bits of a row address RA into a first row bit group RA_L and a second row bit group RA_H. For example, the address generation circuit 140 may define lower bits including a least significant bit (LSB) of the row address RA as a first row bit group RA_L, and the upper bits including a most significant bit (MSB) of the row address RA may be defined as a second row bit group RA_H. The memory device 200 may divide a plurality of rows into a plurality of row groups, select one of the row groups according to the second row bit group RA_H, and select one of the rows of the selected row group according to the first row bit group RA_L.

FIGS. 12A to 12D are diagrams illustrating a configuration of a scrub address P_ADD generated by the address generation circuit 140 according to another embodiment of the present disclosure.

Referring to FIGS. 12A to 12D, the address generation circuit 140 may generate the scrub address P_ADD having an address sequence such that a first column bit group CA_L is allocated at a least significant bit (LSB), and a second column bit group CA_H is allocated between a first row bit group RA_L and a second row bit group RA_H. For example, the address generation circuit 140 may configure (i.e., generate) an address sequence in which the first column bit group CA_L, the second row bit group RA_H, the second column bit group CA_H, and the first row bit group RA_L are sequentially allocated from the LSB. Accordingly, the address generation circuit 140 may configure the address sequence such that the second row bit group RA_H is allocated closer to the LSB than the first row bit group RA_L, thereby controlling the scrub operations to be distributed by row group.

Figure 12A:
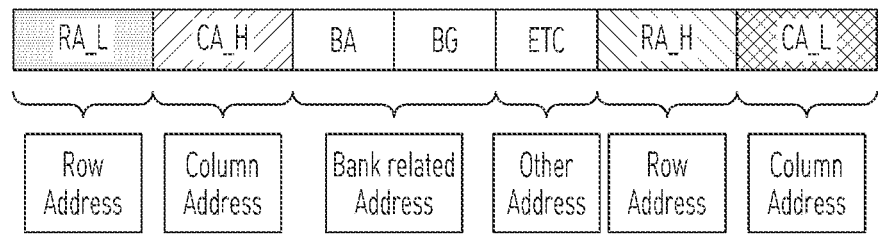
FIGS. 12A to 12D are diagrams illustrating a configuration of a scrub address generated by an address generation circuit according to another embodiment of the present disclosure.

Referring to FIG. 12A, the address generation circuit 140 may allocate a bank related address including a bank address BA and a bank group address BG, between a second column bit group CA_H and a second row bit group RA_H, and allocate other addresses ETC between the bank related address and the second row bit group RA_H. That is, the address generation circuit 140 may generate a scrub address P_ADD having an address sequence in which the first column bit group CA_L, the second row bit group RA_H, the other addresses ETC, the bank group address BG, the bank address BA, the second column bit group CA_H, and the first row bit group RA_L are sequentially allocated from the LSB. According to an embodiment, the address generation circuit 140 may allocate the other addresses ETC between the second column bit group CA_H and the bank related address.

Figure 12B:
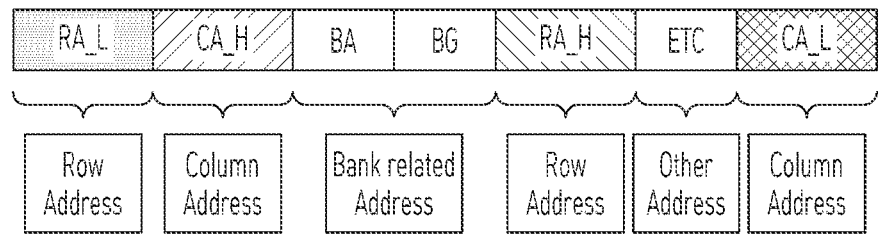

Referring to FIG. 12B, the address generation circuit 140 may allocate a bank related address between a second column bit group CA_H and a second row bit group RA_H, and allocate other addresses ETC between the second row bit group RA_H and the first column bit group CA_L. That is, the address generation circuit 140 may generate a scrub address P_ADD having an address sequence in which the first column bit group CA_L, the other addresses ETC, the second row bit group RA_H, the bank group address BG, the bank address BA, the second column bit group CA_H, and the first row bit group RA_L are sequentially allocated from the LSB.

Figure 12C:
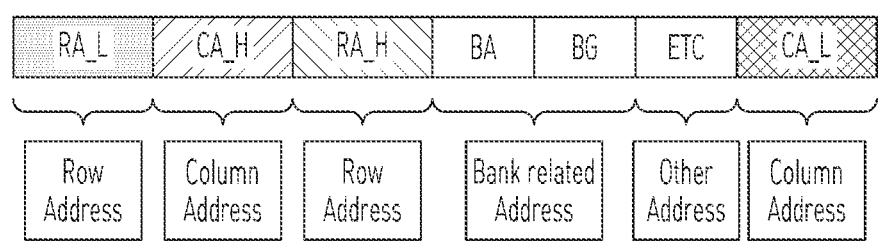

Referring to FIG. 12C, the address generation circuit 140 may allocate a bank related address between a second row bit group RA_H and a first column bit group CA_L, and allocate other addresses ETC between the bank related address and the first column bit group CA_L. That is, the address generation circuit 140 may generate a scrub address P_ADD having an address sequence in which the first column bit group CA_L, the other addresses ETC, the bank group address BG, the bank address BA, the second row bit group RA_H, the second column bit group CA_H, and the first row bit group RA_L are sequentially allocated from the LSB. According to an embodiment, the address generation circuit 140 may allocate the other addresses ETC between the second row bit group RA_H and the bank related address.

Figure 12D:
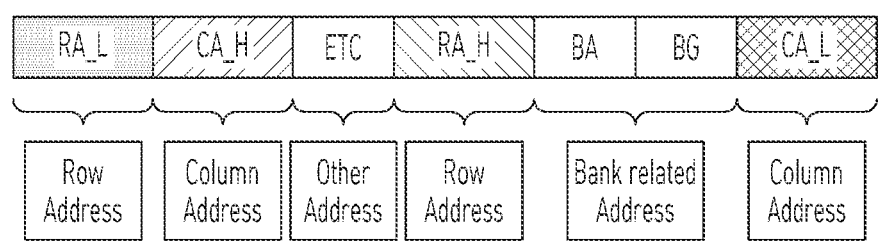

Referring to FIG. 12D, the address generation circuit 140 may allocate a bank related address between a second row bit group RA_H and a first column bit group CA_L, and allocate other addresses ETC between a second column bit group CA_H and the second row bit group RA_H. That is, the address generation circuit 140 may generate a scrub address P_ADD having an address sequence in which the first column bit group CA_L, the bank group address BG, the bank address BA, the second row bit group RA_H, the other addresses ETC, the second column bit group CA_H, and the first row bit group RA_L are sequentially allocated from the LSB.

FIGS. 13A to 13D are diagrams illustrating a configuration of a scrub address P_ADD generated by the address generation circuit 140 according to another embodiment of the present disclosure.

Referring to FIGS. 13A to 13D, the address generation circuit 140 may generate the scrub address P_ADD having an address sequence in which a first column bit group CA_L, a second row bit group RA_H, a first row bit group RA_L, and a second column bit group CA_H are sequentially allocated (or assigned) from a least significant bit (LSB) to a most significant bit (MSB). The address generation circuit 140 may configure (i.e., generate) the address sequence such that the second row bit group RA_H is allocated closer to the LSB than the first row bit group RA_L, thereby controlling the scrub operations to be distributed by row group.

Figure 13A:
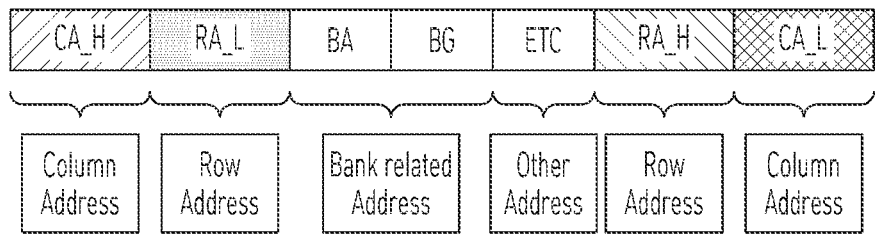
FIGS. 13A to 13D are diagrams illustrating a configuration of a scrub address generated by an address generation circuit according to another embodiment of the present disclosure.

Referring to FIG. 13A, the address generation circuit 140 may allocate a bank related address between a first row bit group RA_L and a second row bit group RA_H, and allocate other addresses ETC between the bank related address and the second row bit group RA_H. That is, the address generation circuit 140 may generate a scrub address P_ADD having an address sequence in which the first column bit group CA_L, the second row bit group RA_H, and the other addresses ETC, the bank group address BG, the bank address BA, the first row bit group RA_L, and the second column bit group CA_H are sequentially allocated from the LSB. According to an embodiment, the address generation circuit 140 may allocate the other addresses ETC between the first row bit group RA_L and the bank related address.

Figure 13B:
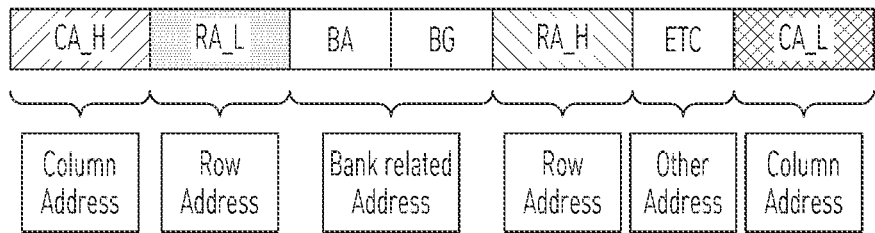

Referring to FIG. 13B, the address generation circuit 140 may allocate a bank related address between a first row bit group RA_L and a second row bit group RA_H, and allocate other addresses ETC between the second row bit group RA_H and a first column bit group CA_L. That is, the address generation circuit 140 may generate a scrub address P_ADD having an address sequence in which the first column bit group CA_L, the other addresses ETC, the second row bit group RA_H, the bank group address BG, the bank address BA, the first row bit group RA_L, and the second column bit group CA_H are sequentially allocated from the LSB.

Figure 13C:
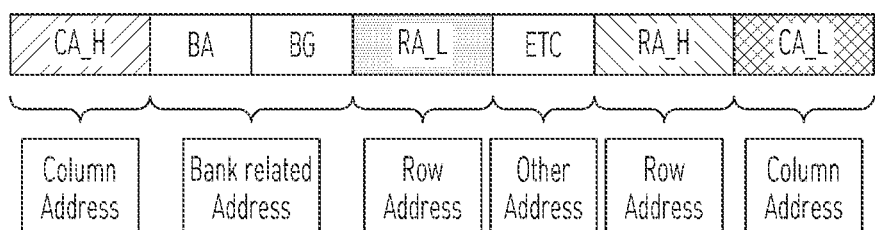

Referring to FIG. 13C, the address generation circuit 140 may allocate a bank related address between a second column bit group CA_H and a first row bit group RA_L, and allocate other addresses ETC between the first row bit group RA_L and a second row bit group RA_H. That is, the address generation circuit 140 may generate a scrub address P_ADD having an address sequence in which the first column bit group CA_L, the second row bit group RA_H, the other addresses ETC, the first row bit group RA_L, the bank group address BG, the bank address BA, and the second column bit group CA_H are sequentially allocated from the LSB.

Figure 13D:
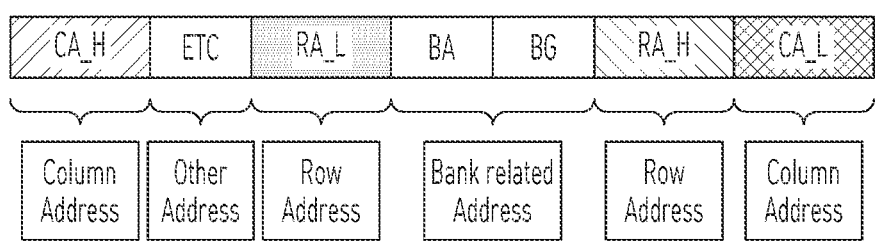

Referring to FIG. 13D, the address generation circuit 140 may allocate a bank related address between a first row bit group RA_L and a second row bit group RA_H, and allocate other addresses ETC between a second column bit group CA_H and the first row bit group RA_L. That is, the address generation circuit 140 may generate a scrub address P_ADD having an address sequence in which the first column bit group CA_L, the second row bit group RA_H, the bank group address BG, the bank address BA, the first row bit group RA_L, the other addresses ETC, and the second column bit group CA_H are sequentially allocated from the LSB.

According to the embodiments of the present disclosure, the memory system may variously change the address sequence so that the scrub operation for one row may be distributed and performed during the scrub operation. Accordingly, it is possible to improve the detection capability of row-fault errors having the possibility of developing an uncorrectable error (UE).

In addition, according to the embodiments of the present disclosure, the memory system may improve the performance by reducing the loss of the log information about the row-fault errors during the error log collection for outputting the log information to the host using a polling or interrupt-based manner.

While the present disclosure has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A memory controller comprising:
   a scrub control circuit configured to generate a scrub command for instructing a scrub operation; and
   an address generation circuit configured to
   generate a scrub address having an address sequence in which a first column bit group of a column address, a row address, and a second column bit group of the column address are sequentially allocated from a least significant bit (LSB) to a most significant bit (MSB), and
   change a value of the scrub address according to the scrub command.

2. The memory controller of claim 1, wherein the address generation circuit is configured to sequentially increase or decrease the value of the scrub address according to the scrub command.

3. The memory controller of claim 1, wherein the address generation circuit is configured to, according to the scrub command:
   increase a value of the row address and a value of the second column bit group by "1"; and
   increase a value of the first column bit group by "k", where k is a positive integer equal to or greater than 2.

4. The memory controller of claim 1, wherein the address generation circuit is configured to, according to the scrub command:
   increase a value of the first column bit group and a value of the second column bit group by "1"; and
   increase a value of the row address by "k", where k is a positive integer equal to or greater than 2.

5. The memory controller of claim 1, wherein the address generation circuit is configured to, according to the scrub command:
   increase a value of the row address and a value of the first column bit group by "1"; and
   increase a value of the second column bit group by "k", where k is a positive integer equal to or greater than 2.

6. The memory controller of claim 1, wherein the address generation circuit is configured to, according to the scrub command:
   increase at least one value of the first column bit group, the row address, and the second column bit group; and
   decrease remaining values.

7. The memory controller of claim 1, wherein the address generation circuit is configured to allocate a bank related address including bank information, between the second column bit group and the row address.

8. The memory controller of claim 7, wherein the address generation circuit is configured to allocate other addresses including at least one of rank information, channel information, and slot information:
between the bank related address and the row address;
between the row address and the first column bit group; or
to upper bits than the bank related address.

9. The memory controller of claim 1, wherein the address generation circuit is configured to allocate a bank related address including bank information, to upper bits than the second column bit group.

10. The memory controller of claim 9, wherein the address generation circuit is configured to allocate other addresses including at least one of rank information, channel information, and slot information:
between the bank related address and the second column bit group;
between the row address and the first column bit group; or
between the second column bit group and the row address.

11. The memory controller of claim 1, wherein the address generation circuit is configured to allocate a bank related address including bank information, between the row address and the first column bit group.

12. The memory controller of claim 11, wherein the address generation circuit is configured to allocate other addresses including at least one of rank information, channel information, and slot information:
between the bank related address and the first column bit group;
between the second column bit group and the row address; or
to upper bits than the second column bit group.

13. The memory controller of claim 1, further comprising:
a memory interface configured to provide the scrub address along with the scrub command to a memory device; and
an error information collection circuit configured to store result data of the scrub operation as log information and output the stored log information according to a request from a host.

14. The memory controller of claim 1, wherein the first column bit group includes lower bits of the column address, and the second column bit group includes upper bits of the column address.

15. A memory controller comprising:
a scrub control circuit configured to generate a scrub command for instructing a scrub operation; and
an address generation circuit configured to
divide a column address into a first column bit group and a second column bit group,
divide a row address into a first row bit group and a second row bit group,
generate a scrub address having an address sequence in which the first column bit group is allocated at a least significant bit (LSB) and the second column bit group is allocated between the first row bit group and the second row bit group, and
change a value of the scrub address according to the scrub command.

16. The memory controller of claim 15, wherein the address generation circuit is configured to allocate a bank related address including bank information, between the second column bit group and the second row bit group.

17. The memory controller of claim 16, wherein the address generation circuit is configured to allocate other addresses including at least one of rank information, channel information, and slot information:
between the bank related address and the second row bit group; or
between the second row bit group and the first column bit group.

18. The memory controller of claim 15, wherein the address generation circuit is configured to allocate a bank related address including bank information, between the second row bit group and the first column bit group.

19. The memory controller of claim 18, wherein the address generation circuit is configured to allocate other addresses including at least one of rank information, channel information, and slot information:
between the bank related address and the first column bit group; or
between the second column bit group and the second row bit group.

20. A memory controller comprising:
a scrub control circuit configured to generate a scrub command for instructing a scrub operation; and
an address generation circuit configured to
divide a column address into a first column bit group and a second column bit group,
divide a row address into a first row bit group and a second row bit group,
generate a scrub address having an address sequence in which the first column bit group, the second row bit group, the first row bit group, and the second column bit group are sequentially allocated from a least significant bit (LSB) to a most significant bit (MSB), and
change a value of the scrub address according to the scrub command.

21. The memory controller of claim 20, wherein the address generation circuit is configured to allocate a bank related address including bank information, between the first row bit group and the second row bit group.

22. The memory controller of claim 21, the address generation circuit is configured to allocate other addresses including at least one of rank information, channel information, and slot information:
between the bank related address and the second row bit group; or
between the second row bit group and the first column bit group.

23. The memory controller of claim 20, wherein the address generation circuit is configured to:
allocate a bank related address including bank information, between the second column bit group and the first row bit group; and
allocate other addresses including at least one of rank information, channel information, and slot information, between the first row bit group and the second row bit group.

24. The memory controller of claim 20, wherein the address generation circuit is configured to:
allocate a bank related address including bank information, between the first row bit group and the second row bit group; and
allocate other addresses including at least one of rank information, channel information, and slot information, between the second column bit group and the first row bit group.

25. A memory system comprising:
a memory controller configured to
generate a scrub address having an address sequence in which a first column bit group of a column address, a row address, and a second column bit group of the column address are sequentially allocated from a least significant bit (LSB) to a most significant bit (MSB),
change a value of the scrub address according to a scrub command, and
provide the scrub address with the scrub command; and
a memory device including memory cells arranged between a plurality of rows and a plurality of columns, the memory device configured to perform a scrub operation on a selected row and a selected column by the scrub address, according to the scrub command.

26. The memory system of claim 25, wherein the memory device is configured to:
divide the plurality of columns into a plurality of column groups;
select one of the column groups according to the second column bit group; and
select one of the columns of the selected column group according to the first column bit group.

27. The memory system of claim 26, wherein the memory device is configured to sequentially perform the scrub operation for each of the plurality of column groups.

28. The memory system of claim 25, wherein the memory device is configured to:
perform the scrub operation including a read operation for reading data from memory cells coupled between the selected row and the selected column;
provide the read data to the memory controller; and
provide a re-write operation for writing error-corrected data provided from the memory controller, back to the memory cells.

29. The memory system of claim 28, wherein the memory controller is configured to:
check and correct an error in the read data to generate the error-corrected data; and
store result data of the scrub operation as log information and output the stored log information according to a request from a host.

30. The memory system of claim 25, wherein the memory controller is configured to allocate a bank related address including bank information:
between the second column bit group and the row address;
to upper bits than the second column bit group; or
between the row address and the first column bit group.

31. The memory system of claim 25, wherein the memory controller is configured to, according to the scrub command:
increase two values of the row address, the first column bit group and the second column bit group by "1"; and
increase the other value by "k", where k is a positive integer greater than 2.

32. The memory system of claim 25, wherein the memory controller is configured to, according to the scrub command:
increase at least one value of the first column bit group, the row address, and the second column bit group; and
decrease remaining values.

33. The memory system of claim 25, wherein the first column bit group includes lower bits of the column address, and the second column bit group includes upper bits of the column address.

* * * * *